(12) United States Patent
Reed et al.

(10) Patent No.: US 6,834,913 B2
(45) Date of Patent: Dec. 28, 2004

(54) STRUCTURAL COMPOSITE AIR HANDLING DUCT

(75) Inventors: Daniel P. Reed, Warren, MI (US); Ronald K. Roberts, Dearborn, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 78 days.

(21) Appl. No.: 10/293,742

(22) Filed: Nov. 13, 2002

(65) Prior Publication Data

US 2004/0090088 A1 May 13, 2004

(51) Int. Cl.⁷ .................................................. B60J 7/00
(52) U.S. Cl. ........................................ 296/208; 296/70
(58) Field of Search .......................... 296/208, 70, 72, 296/193.02, 214, 211, 901; 428/63; 439/67; 264/45.9; 180/90; 454/69, 127, 143, 162

(56) References Cited

U.S. PATENT DOCUMENTS

| | | | |
|---|---|---|---|
| 3,054,636 A | | 9/1962 | Wessells, III |
| 4,288,896 A | | 9/1981 | West et al. |
| 4,409,270 A | * | 10/1983 | Faber et al. .................. 428/63 |
| 4,440,434 A | | 4/1984 | Celli |
| 4,457,547 A | | 7/1984 | Sekiyama et al. |
| 4,608,744 A | | 9/1986 | Nemoto |
| 4,863,771 A | | 9/1989 | Freeman |
| 5,088,571 A | * | 2/1992 | Burry et al. .................. 296/70 |
| 5,190,803 A | | 3/1993 | Goldbach et al. |
| 5,294,164 A | * | 3/1994 | Shimabara et al. ........... 296/72 |
| 5,354,114 A | * | 10/1994 | Kelman et al. ............. 296/208 |
| 5,358,300 A | * | 10/1994 | Gray ........................ 296/208 |
| 5,487,800 A | * | 1/1996 | Ash ............................ 296/70 |
| 5,549,345 A | * | 8/1996 | Cawthon et al. ........... 296/208 |
| 5,564,515 A | * | 10/1996 | Schambre .................... 296/70 |
| 5,656,353 A | | 8/1997 | Butler |
| 5,709,309 A | * | 1/1998 | Gallagher et al. ......... 296/208 |
| 5,823,602 A | | 10/1998 | Kelman et al. |
| 5,846,634 A | | 12/1998 | Werth et al. |
| 5,885,091 A | * | 3/1999 | Belanger et al. ............. 439/67 |
| 5,888,600 A | | 3/1999 | Wycech |
| 5,934,744 A | * | 8/1999 | Jergens et al. ............. 296/208 |
| 5,979,965 A | * | 11/1999 | Nishijima et al. ......... 296/208 |
| 6,062,635 A | * | 5/2000 | Learman et al. ........... 296/208 |
| 6,086,145 A | * | 7/2000 | Wandyez .................... 296/214 |
| 6,092,854 A | * | 7/2000 | Campbell .................... 296/70 |
| 6,096,403 A | | 8/2000 | Wycech |
| 6,120,090 A | * | 9/2000 | Van Ert et al. ............. 296/211 |
| 6,305,733 B1 | * | 10/2001 | Rahmstorf et al. ......... 296/208 |
| 6,311,452 B1 | | 11/2001 | Barz et al. |

(List continued on next page.)

FOREIGN PATENT DOCUMENTS

| | | |
|---|---|---|
| EP | 0272334 A1 | 6/1988 |
| EP | 1329302 A1 | 7/2003 |
| FR | 2813942 A1 | 3/2002 |
| FR | 2823152 A1 | 10/2002 |
| WO | WO 00/56517 | 9/2000 |

OTHER PUBLICATIONS

English Patent Abstract of Japan, Publication No. 62099206, published Aug. 5, 1987.
French Search Report.

*Primary Examiner*—Kiran Patel
(74) *Attorney, Agent, or Firm*—Brinks Hofer Gilson & Lione

(57) ABSTRACT

The present invention is generally directed towards a composite structural fluid handling duct in a motor vehicle. The composite structural fluid handling duct comprises a substrate defining an aperture and a blow molded member, wherein a portion of the blow molded member extends into the aperture to form a retaining member. A portion of the substrate forming the aperture is deformed such that the aperture has an inner dimension and an outer dimension. The composite structural fluid handling duct also has an inlet for allowing fluid to enter, and at least one outlet for exhausting fluid from the duct.

9 Claims, 7 Drawing Sheets

U.S. PATENT DOCUMENTS

| | | | |
|---|---|---|---|
| 6,315,354 B1 * | 11/2001 | Tani et al. | 296/208 |
| 6,318,797 B1 * | 11/2001 | Bohm et al. | 296/208 |
| 6,409,590 B1 * | 6/2002 | Suzuki et al. | 296/70 |
| 6,409,947 B1 * | 6/2002 | Wandyez | 264/45.9 |
| 6,447,041 B1 * | 9/2002 | Vandersluis et al. | 296/208 |
| 6,471,285 B1 | 10/2002 | Czaplicki et al. | |
| 6,517,145 B2 * | 2/2003 | Hedderly | 296/70 |
| 6,520,849 B1 * | 2/2003 | Greenwald et al. | 296/208 |
| 6,612,613 B1 * | 9/2003 | Hodges | 296/70 |
| 6,644,722 B2 * | 11/2003 | Cooper | 296/208 |
| 6,668,513 B2 * | 12/2003 | Roberts et al. | 296/208 |
| 6,688,680 B1 * | 2/2004 | Cooper et al. | 296/208 |
| 6,705,671 B1 * | 3/2004 | Glovatsky et al. | 296/70 |
| 6,705,672 B2 * | 3/2004 | Shikata et al. | 296/208 |

* cited by examiner

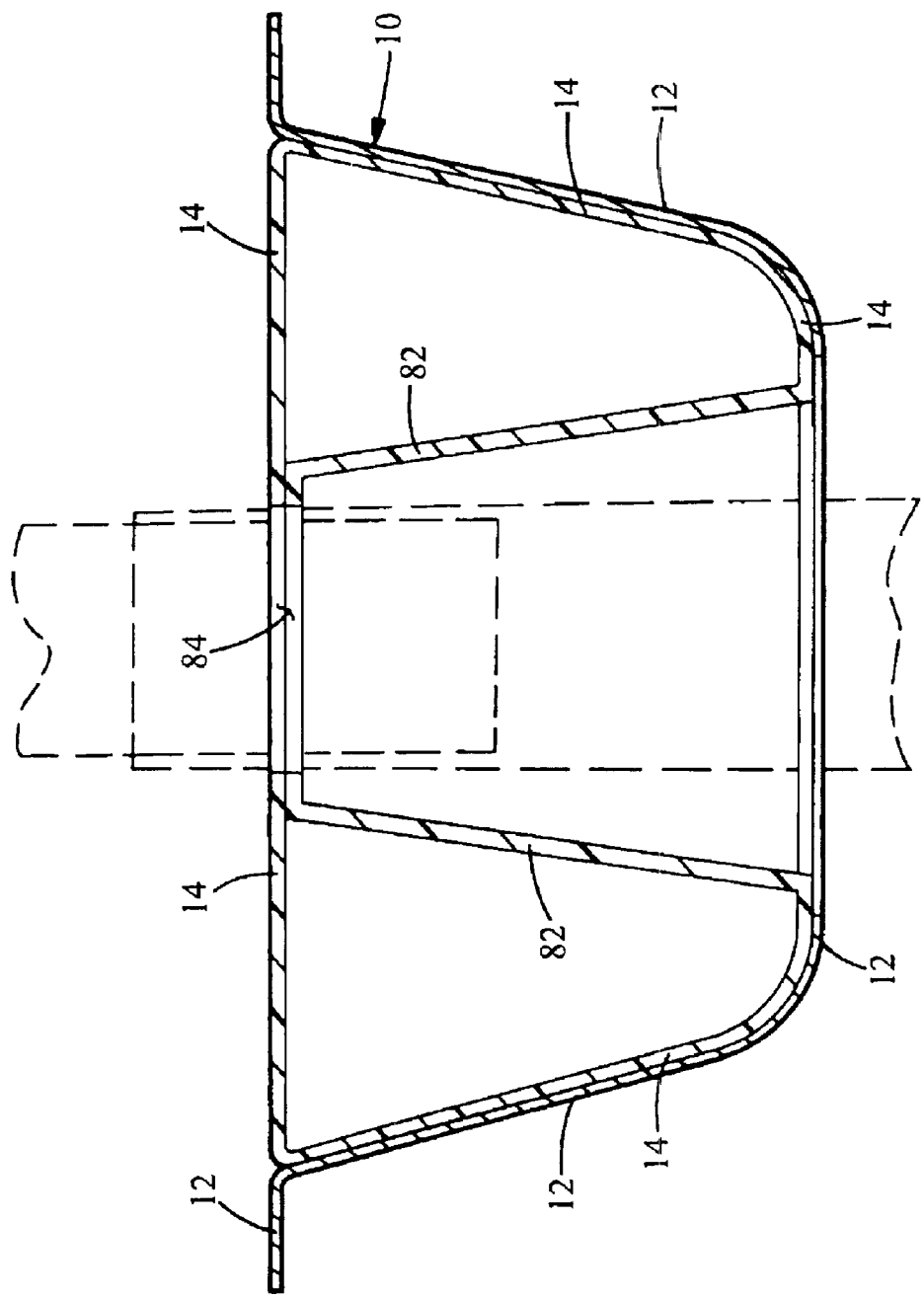

STRUCTURAL COMPOSITE AIR HANDLING DUCT

TECHNICAL FIELD

This invention generally relates to a structural fluid handling duct formed of a metal substrate, reinforced by a blow-molded member. More specifically, this invention relates to a structural fluid handling duct made of a metal coupled to a plastic blow-molded portion.

BACKGROUND

Today's automotive design seeks new methods of manufacturing lighter components having increased structural rigidity. Such lightweight components find use in automotive components such as vehicle seats, cross bar, support brackets, etc. It is also desirable to reduce the number of components in vehicles such that one component performs more than one function. With regard to vehicle cross car beams, much effort has previously focused on utilizing the structural integrity of the outboard register ducts to support the substrate. These previous designs typically required significant reinforcement with an additional steering column support bracket.

SUMMARY

In accordance with the preferred embodiment of the present invention, a structural fluid handling duct is formed of a substrate, reinforced by a blow-molded member. In order to retain the blow molded member to the substrate, the substrate is provided with an aperture. A portion of the blow-molded member extends into the aperture to form a retention member such that the substrate is mechanically bonded to the blow-molded member.

In yet another aspect of the present invention, the aperture of the substrate is formed such that it defines an inner dimension and an outer dimension; the inner dimension being less than the outer dimension.

In yet another aspect of the present invention, the aperture on the substrate can be formed by either mechanically deforming those portions of the substrate defining the aperture or by molding the portions of the substrate defining the aperture to the desired configuration.

In yet another aspect of the present invention, the fluid handling duct includes a passageway to allow other vehicle components to pass through the air handling duct.

Further features and advantages of the invention will become apparent to one ordinary skilled in the art from the following discussion and the accompanying drawings.

BRIEF DESCRIPTION OF THE DRAWINGS

FIG. 11 is a sectional view taken along line 11—11 of FIG. 2.

DETAILED DESCRIPTION

The following description of the preferred embodiment is merely exemplary in nature and is in no way intended to limit the invention or its application or uses.

Figure 1:
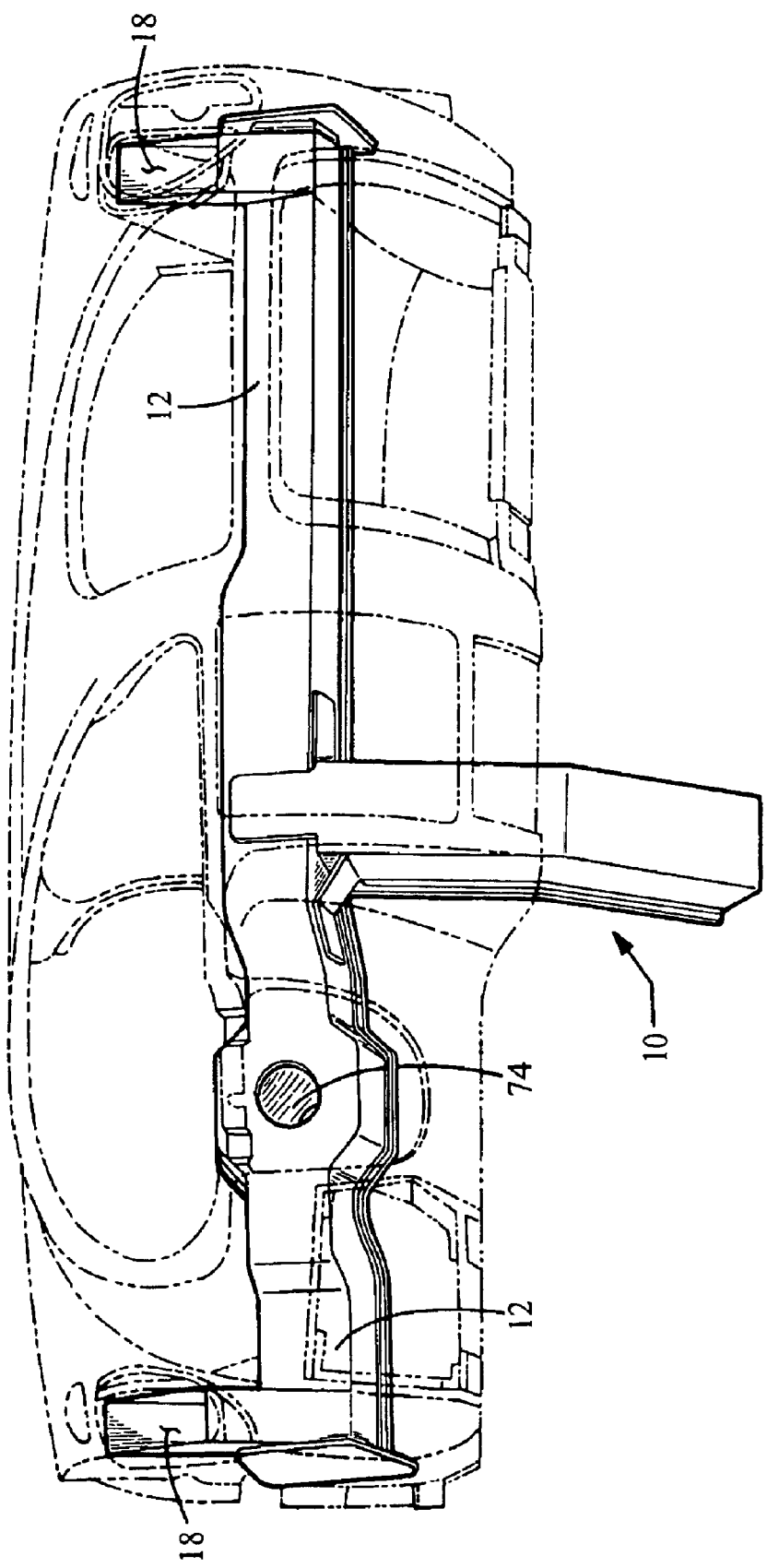
FIG. 1 is a front view of the instrument panel as installed in a motor vehicle in accordance with the teachings of the present invention.
Figure 2:
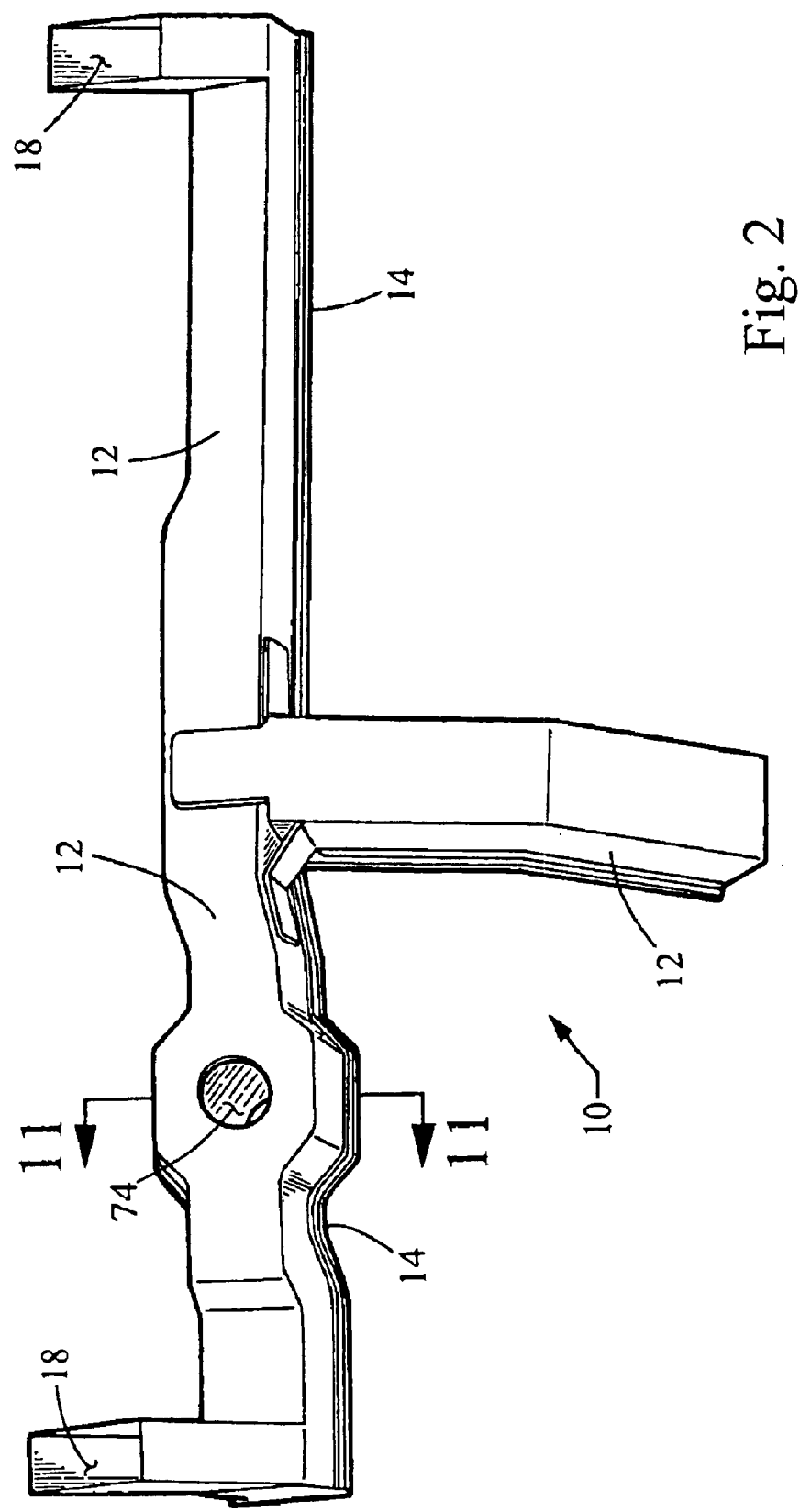
FIG. 2 is a front view of the structural member in accordance with the teachings of the present invention.
Figure 3:
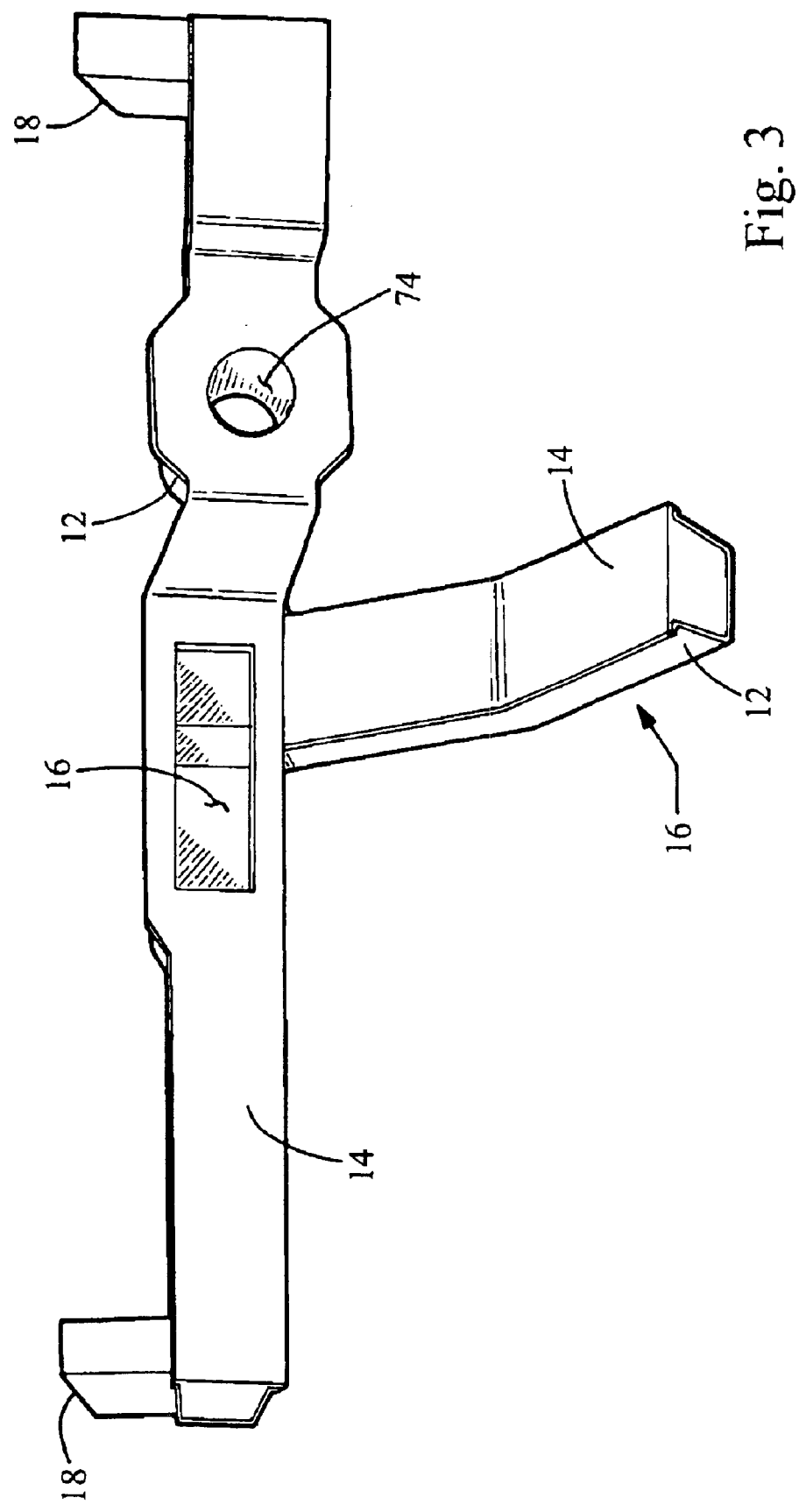
FIG. 3 is a back view of the structural member having the blow-molded member in accordance with the teachings of the present invention.

Referring to FIGS. 1, 2, and 3, a composite structural fluid handling duct is generally shown and designated by reference numeral 10. The structural member 10 comprises a substrate 12 and a blow molded member 14, reinforcing the substrate 12. The blow molded member 14 provides structural integrity to the substrate 12. Preferably, the substrate 12 is a sheet formed from a suitable metal such as aluminum, iron, copper or alloys thereof. Preferably, the blow molded member 14 is formed from materials such as plastic, plastic composite or thermoplastic resin such as PET or nylon.

As described herein, the structural fluid handling duct is for air. However, it is to be understood, that the present invention could be applicable to other fluids besides air, such as other gases, and liquids. For example, the present invention could be tailored for a recreational vehicle or a stationary building structure to transport liquids such as water, and waste water.

Preferably, the air handling duct 10 includes an inlet 16, as shown in FIG. 3, to allow forced air to enter into the fluid handling duct 10. Likewise, the air handling duct 10 includes at least one outlet 18, as shown in FIGS. 1 and 2. The outlets 18 are adapted to allow air that is forced through the air handling duct 10 to be exhausted into the interior of the vehicle. Because the blow molded member 14 is formed by blow molding, the blow molding member 14 provides a sealed interior ideal for transporting forced air between the inlet 16 and the outlets 18.

Figure 4:
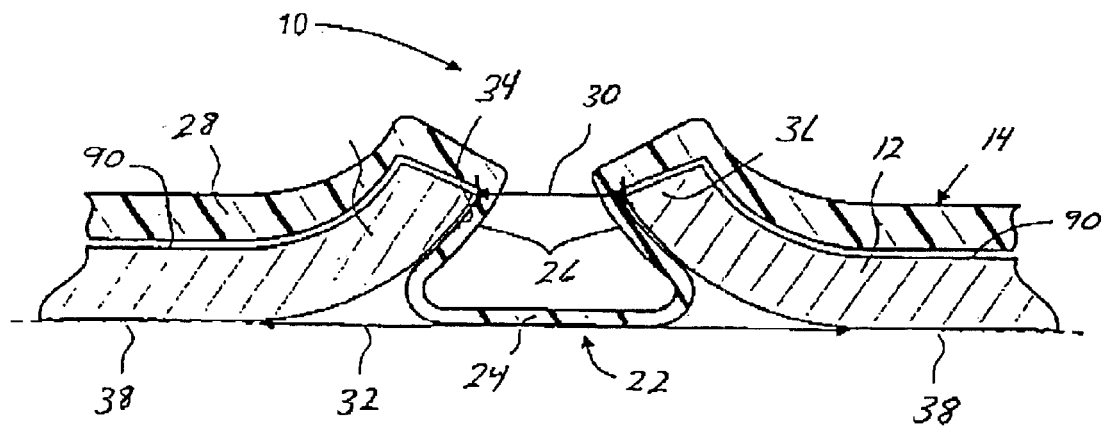
FIGS. 4, 5, and 6 are cross sectional views of a portion of a composite structural member illustrating differently formed apertures.

Referring to FIG. 4, the substrate 12 has an inner surface 90 and an outer surface 38. The blow molded member 14 is positioned adjacent the inner surface 90 of the substrate 12. In order to mechanically bond the blow molded member 14 to the inner surface of the substrate 12, the substrate 12 has an aperture 20. Although through this application a single aperture 20 is shown and discussed, it must be understood that the substrate 12 may define a plurality of apertures 20. A portion of the blow molded member 14 extends into the aperture 20 to define a retention member 22. The retention member 22 engages the outer surface 38 of the substrate 12 and provides the necessary mechanical bond to hold the blow molded member 14 to the substrate 12. The retention member 20 has a base or a bottom 24 and arms 26 extending from the base 24 engulfing the aperture 20 and merging with a body portion 28 of the blow molded member 14.

In order for the blow molded member 14 to form the retention member 22, the portion of the substrate 12 defining the aperture 20 is formed such that the aperture 20 defines an inner dimension, represented by reference numeral 30 and an outer dimension, represented by reference numeral 32. As used herein, the inner dimension 30 is located towards the inner surface 90 of the substrate 12. The outer dimension 32 is located towards the opposite side, or exterior surface 38, of the substrate 12. Preferably, the outer dimension 32 is larger than the inner dimension 30, and the retention member 22 is larger than the inner dimension 30 such that the retention member 22 is secured within the aperture 20, thereby securing the blow molded member 14 to the substrate 12.

Figure 6:
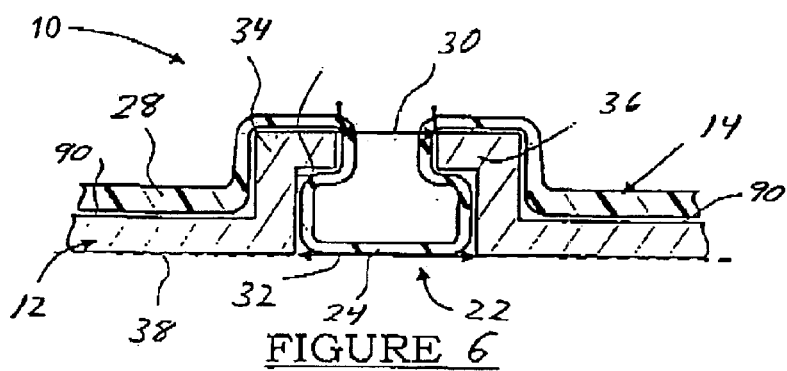
Figure 5:
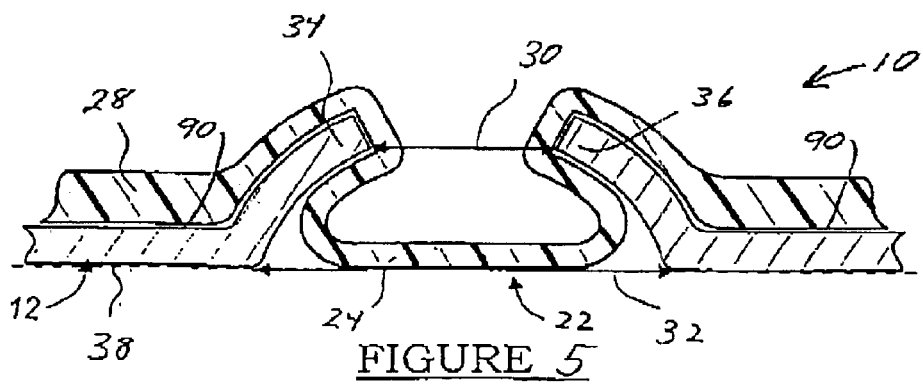

So as to form the retention member 22 and effectively retain the blow molded member 14 to the substrate 12 the portions of the substrate 12 defining the aperture 20 may be formed using a number of different techniques. For example, as shown in FIG. 4, an initial aperture may be laser cut or otherwise formed in the substrate 12 and the portions defining the aperture 20 deformed as indicated at 34 and 36 by punching the substrate 12. Depending on the shape of the punching tool used, the deformed portions 34 and 36 may be outwardly convex. On the other hand, as shown in FIG. 5, the deformed portions 34, 36 depending on the punching tool, can be outwardly concave in shape. In yet another example shown in FIG. 6, the portions 34, 36 defining the aperture 20 are formed by molding the substrate 12. Here the portions 34, 36 are formed into an inverted L-shaped when viewed in cross-section. In all the examples shown above, the inner dimension 30 of aperture 20 is smaller than the outer dimension 32 of the aperture 20.

By forming the aperture 20 as described above, when the blow molded member 14 is being blow molded, a portion of the material forming the blow molded member 14 will be blown into the aperture 20. As this portion is expanded by the blow molding medium, the portion expands forming the bulb like retention member 22 within the aperture 20. In the preferred embodiments and as clearly shown in FIGS. 5, 6 and 7, the base 24 of the retention member 22 is flush with the exterior surface 38 of the substrate 12, such that the retention member 22 does not protrude out of the aperture 20. Formed in this manner, the air handling duct 10 lends itself to easier manufacturing and removal from the mold in which it was formed.

Figure 7:
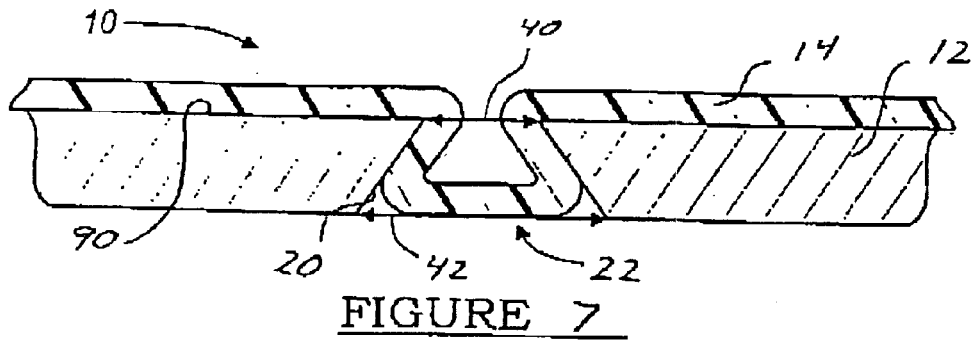
FIG. 7 is a cross sectional view of a portion of a composite structural member, wherein the aperture in the substrate is formed as a tapered bore in the substrate.
Figure 8:
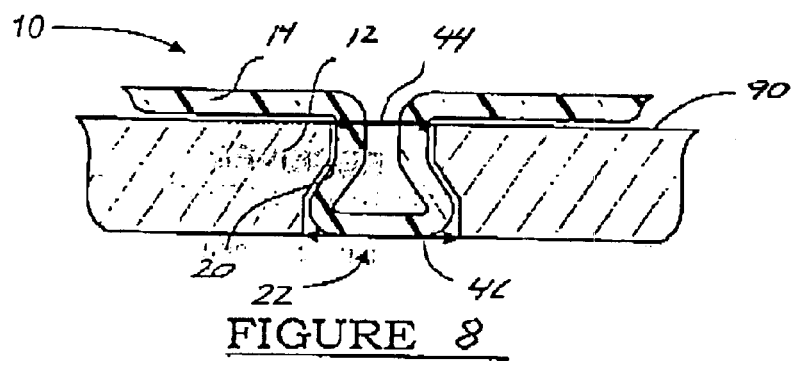
FIG. 8 is a cross sectional view of a portion of a composite structural member, wherein the aperture in the substrate is formed as a countersunk bore in the substrate.
Figure 9:
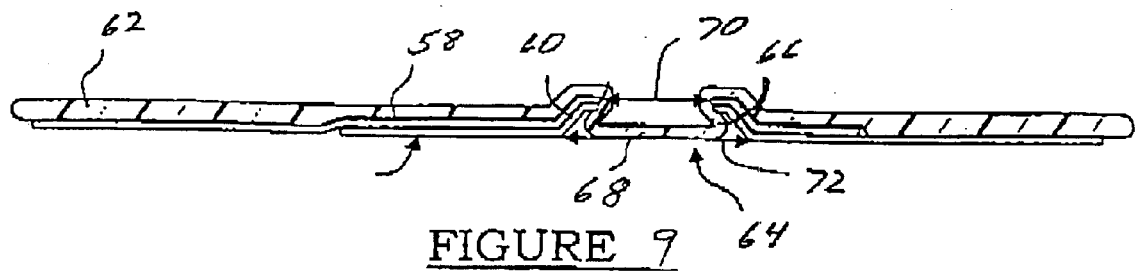
FIG. 9 is an alternate embodiment of the composite structural member of FIG. 1, wherein the blow molded portion is used to join the two substrates together.

Referring in particular to FIGS. 7 and 8, further embodiments of the aperture 20 are seen therein. These embodiments, which can be used instead of the previously discussed embodiments are especially preferred where a thick substrate 12 is used. When the substrate 12 is thick it may be difficult to deform or shape a portion of the substrate 12 forming the previously discussed aperture 20. As clearly shown in FIG. 8, the aperture 20 is provided as a tapered bore such that an inner dimension 40 of the tapered bore is smaller than the outer dimension 42. On the other hand, as shown in FIG. 9, the aperture 20 is provided as countersunk bore, wherein the aperture 20 again defines an inner dimension 44 and an outer dimension of 46. Such bores may be drilled into the substrate 12 or they may be formed as such during forming of the substrate 12.

FIG. 9 represents an alternate embodiment of the air handling duct 10 discussed above. As shown, a substrate 56 of the alternate embodiment comprises a first substrate 58, a second substrate 60 and a blow molded member 62 reinforcing and retaining the first substrate 58 and the second substrate 60 together. Similarly to the previous embodiment, the first substrate 58 and the second substrate 60 define an aperture 64 from portions of the substrates 58 and 60. A portion of the blow molded member 62 extends into the aperture 64 to form a retention member 66. The retention member 66 mechanically bonds the first substrate 58 and the second substrate 60 to the blow molded member 62. As in the prior embodiments, the retention member 66 defines a base or a bottom 68 that is flush with the exterior of the substrates 58, 60. The aperture 64 similarly defines an inner dimension 70 and an outer dimension 72.

In order to form the retention member 66 in the aperture 64, it is preferred that the inner dimension 70 of the deformed portions is smaller than the exterior dimension 72. As seen in FIG. 9, the first substrate 58 partially overlaps the second substrate 60 in the region surrounding the aperture 64. One or both of the substrates 58, 60 are in contact with the blow molded member 62 and one of the substrates 58, 60 could be a PC board, as mentioned above. The air handling duct of the second preferred embodiment is identical to the air handling duct 10 of the first preferred embodiment in all other ways and is capable of performing the functions described above.

Referring to FIGS. 2 and 3, the air handling duct 10 includes at least one passageway 74 extending therethrough. A passageway 74 is necessary because due to the placement of the air handling duct 10 within the vehicle, other components of the vehicle, such as wiring or the steering wheel column, must pass through the air handling duct 10. Because the air handling duct 10 must remain substantially sealed, it is not acceptable to simply cut holes within the air handling duct 10 to accommodate such components.

Figure 10:
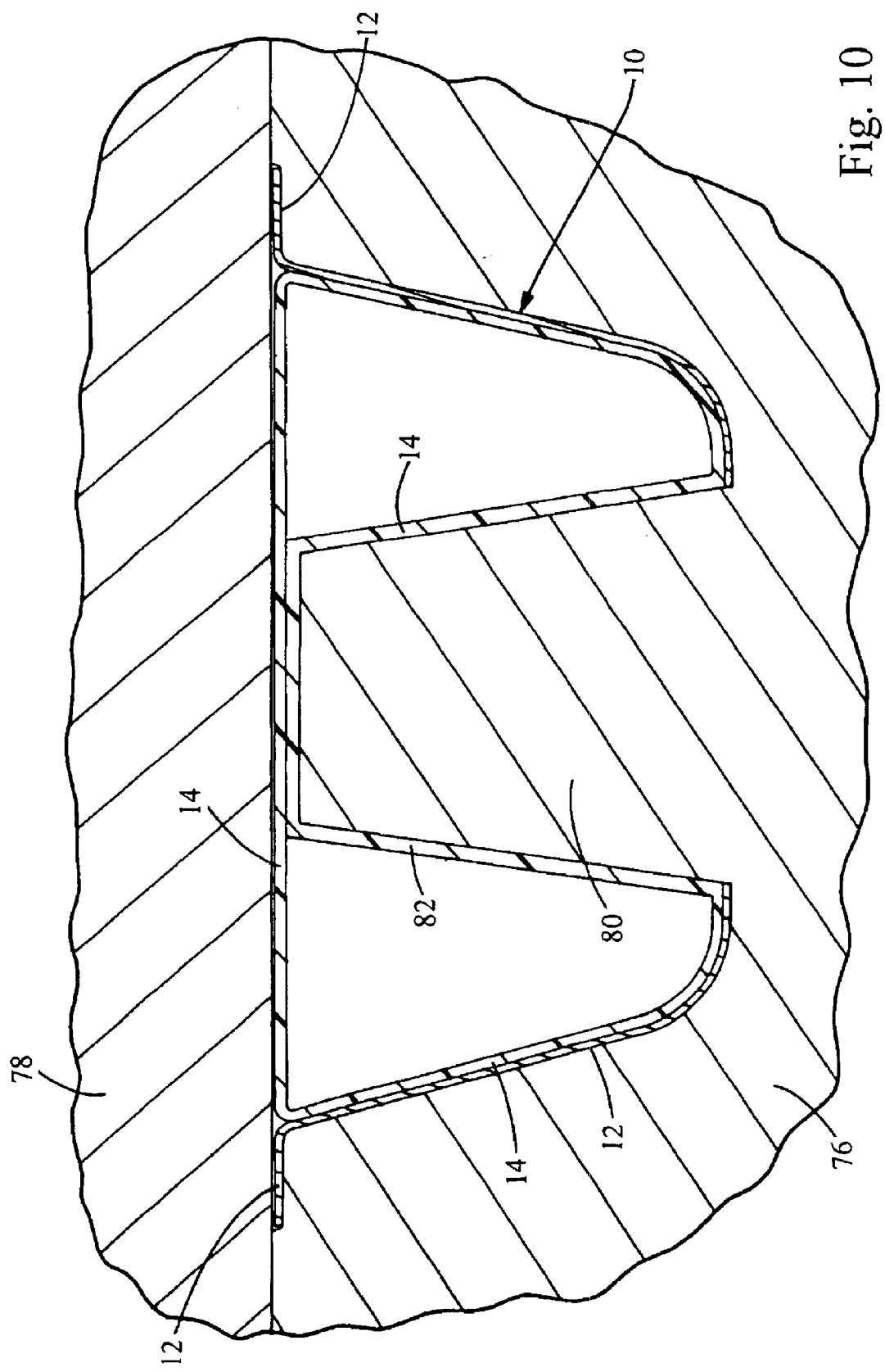
FIG. 10 is a sectional view illustrating how the die forms the passageway within the air handling duct.

Preferably, the passageway 74 is formed during the blow molding of the blow molded member 14. Referring to FIG. 10, the blow molding die 76, 78 includes a cone shaped portion 80 such that when the die halves 76, 78 close together on the plastic resin and air is blown therein, a sleeve 82 is formed between opposite sides of the blow molded member 14. The sleeve 82 is open toward one end, where the cone shaped portion 80 of the die 76 extended outward, and closed at the other end, where the cone shaped portion 80 of the die 76 pushed opposing sides of the plastic resin extrusion together. Referring to FIG. 11, after the die halves 76, 78 are removed from the air handling duct 10, an opening 84 is cut into the closed end of the sleeve 82 to open the passageway 74 through the air handling duct 10. Both ends of the sleeve 82 are integral and sealed with the blow molding member 14 such that the passageway 74 does not allow any air leakage from the air handling duct 10.

As a person skilled in the art will recognize from the previous description and from the figures and claims, modifications and changes can be made to the preferred embodiment of the invention without departing from the scope of the invention as defined in the following claims.

What is claimed is:

1. A composite structural fluid handling duct comprising:
   a substrate, portions of said substrate defining an aperture, said aperture defining an inner dimension and an outer dimension, said inner dimension being smaller than said outer dimension;
   a blow molded member in contact with said inner surface of said substrate;
   portions of said blow molded member defining a retaining member, said retaining member extending outward through said aperture and being larger than said inner dimension, thereby mechanically retaining said substrate to said blow molded member;
   an inlet adapted to allow fluid to enter said fluid handling duct; and
   at least one outlet adapted to allow fluid that enters said fluid handling duct to be exhausted from said fluid handling duct.

2. The composite structural fluid handling duct of claim 1, wherein said retaining member is formed flush with an outer surface of the substrate opposite an inner surface of said substrate that is in contact with said blow molded member.

3. The composite structural fluid handling duct of claim 2 further including at least one passageway extending therethrough.

4. The composite structural fluid handling duct of claim 3 wherein said passageway is adapted to receive a steering column of the vehicle, thereby allowing the steering column to pass through said air handling duct.

5. The composite structural fluid handling duct of claim 3 wherein said passageway is adapted to receive wiring associated with the electrical system of the automobile.

6. The composite structural fluid handling duct of claim 3 wherein said passageway includes a sleeve portion extending across said air handling duct, said sleeve portion being in sealed engagement with said air handling duct at opposing ends such that said passageway does not allow any air leakage from said fluid handling duct.

7. The composite structural fluid handling duct of claim 1, wherein said aperture is defined as a tapered bore.

8. The composite structural fluid handling duct of claim 1, wherein said aperture is defined as a countersunk bore.

9. The composite structural fluid handling duct of claim 1, wherein said substrate is formed of a material selected from a group consisting of aluminum, copper, iron, or alloys thereof.

* * * * *

UNITED STATES PATENT AND TRADEMARK OFFICE
CERTIFICATE OF CORRECTION

PATENT NO. : 6,834,913 B2
DATED : December 28, 2004
INVENTOR(S) : Daniel P. Reed et al.

It is certified that error appears in the above-identified patent and that said Letters Patent is hereby corrected as shown below:

<u>Column 6,</u>
Line 12, add the following claims:
-- 10. The composite structural fluid handling duct of claim 1, wherein said substrate comprises a first substrate and a second substrate, said second substrate being retained to said first substrate by said retaining member.

11. The composite structural fluid handling duct of claim 10, wherein said second substrate is a PC board. --

Signed and Sealed this

Thirty-first Day of May, 2005

JON W. DUDAS
*Director of the United States Patent and Trademark Office*